US006661560B1

(12) United States Patent
Sobolewski

(10) Patent No.: US 6,661,560 B1
(45) Date of Patent: Dec. 9, 2003

(54) MAGNETO-OPTICAL MODULATOR FOR SUPERCONDUCTING DIGITAL INTERFACE

(75) Inventor: Roman Sobolewski, Pittsford, NY (US)

(73) Assignee: University of Rochester, Rochester, NY (US)

( * ) Notice: Subject to any disclaimer, the term of this patent is extended or adjusted under 35 U.S.C. 154(b) by 136 days.

(21) Appl. No.: 09/935,777

(22) Filed: Aug. 24, 2001

Related U.S. Application Data
(60) Provisional application No. 60/269,290, filed on Feb. 16, 2001.

(51) Int. Cl.[7] .............................. G02F 1/09; G02F 1/00
(52) U.S. Cl. ...................... 359/283; 359/280; 359/324
(58) Field of Search ................. 359/280, 281, 359/282, 283, 284, 324

(56) References Cited

U.S. PATENT DOCUMENTS

| | | | |
|---|---|---|---|
| 3,418,036 A | 12/1968 | Holtzberg et al. ........... 359/283 |
| 4,575,179 A | 3/1986 | Lee et al. ........................ 385/6 |
| 5,400,416 A | 3/1995 | Enokihara et al. .............. 385/2 |
| 5,459,800 A | 10/1995 | Enokihara et al. .............. 385/3 |
| 5,479,539 A | 12/1995 | Goldsmith et al. ........... 385/14 |
| 5,621,837 A | 4/1997 | Yamada et al. ................ 385/88 |
| 6,243,180 B1 | 6/2001 | Kanterakis et al. .......... 359/133 |
| 6,476,956 B1 * | 11/2002 | Cottrell et al. ............... 359/280 |
| 2002/0118903 A1 * | 8/2002 | Cottrell et al. ................ 385/6 |

FOREIGN PATENT DOCUMENTS

| EP | 0 942 317 A1 | 9/1999 |
|---|---|---|
| JP | 64-010679 A | 1/1989 |

OTHER PUBLICATIONS

R. Sobolewski and J. Park, "Magneto–Optical Modulator for Superconducting Digital Interface", IEEE Transaction on Applied Supercoinductivity, vol. 11, No. 1, pp. 727–730, Mar. 2001.*

* cited by examiner

*Primary Examiner*—David N Spector
(74) *Attorney, Agent, or Firm*—Blank Rome, LLP

(57) ABSTRACT

A magneto-optic modulator modulates signals from a superconducting circuit such as a single-flux-quantum (SFQ) logic system onto a carrier wave light beam. The modulator is formed by depositing a magneto-optic material such as EuSe onto a superconducting ground plane such as that of the circuit. A microwave microstrip line is formed on the magneto-optic material and carries a signal from the circuit. The signal induces an H field in the magneto-optic material which causes the magneto-optic material to modulate the light.

8 Claims, 2 Drawing Sheets

MAGNETO-OPTICAL MODULATOR FOR SUPERCONDUCTING DIGITAL INTERFACE

REFERENCE TO RELATED APPLICATION

The present application claims the benefit of U.S. Provisional Application No. 60/269,290, filed Feb. 16, 2001, whose disclosure is hereby incorporated by reference in its entirety into the present application.

STATEMENT OF GOVERNMENT INTEREST

The work leading to the present invention was supported by U.S. Office of Naval Research Grant No. N00014-00-1-0237. The Government has certain rights in the present invention.

FIELD OF THE INVENTION

The present invention is directed to a magneto-optical modulator and more specifically to a magneto-optical modulator suitable for providing an optical interface for a superconducting single-flux-quantum (SFQ) logic system or the like.

DESCRIPTION OF RELATED ART

Ultrafast superconducting optoelectronics is an acknowledged field of technological importance, and much research has been performed in this area in recent years. The fastest digital electronic circuits are superconducting single-flux-quantum (SFQ) logic systems, based on resistively shunted Josephson tunnel junctions. Circuits fabricated in the Nb tri-layer process with a 1.5-$\mu$m feature size have demonstrated 20–40 GHz clock speed, while reducing the linewidth to 0.8 $\mu$m would allow circuit speeds to exceed 100 GHz, even in complex designs. Junctions with a 0.8-$\mu$m width are expected to be the baseline hardware for the central processors of the petaflops computer, expected to be realized in 2003 under the HTMT project.

Implementation of the predicted speed of SFQ circuitry in any full-performance system, or even in a demonstration prototype, requires a new paradigm regarding digital input/output (I/O) communication between the SFQ processor and the outside world. The currently used semirigid transmission lines are too dispersive and lossy at very high frequencies, and above all, they consume too much of the cooling power of the cryogenic-to-room temperature interface. It is estimated that copper interconnects will be responsible for 75% of the total power load for the processing portion of the petaflops design. Only optical I/O can assure hundreds of GHz bit rates and excellent thermal isolation.

Ultrafast optical-to-electrical transducers for the digital input of the SFQ circuits have been proposed either in the form of Nb-semiconductor-Nb diodes, or as low-temperature and high-temperature superconducting hot-electron photodetectors. It is now generally accepted that optical transducers should be able to transform the multi-Gb/s input information coded in the form of a train of optical pulses to the electrical domain and, subsequently, through a Josephson junction pulse shaper (dc-to-SFQ converter), feed the SFQ pulses into the processor. The output SFQ-to-optical digital interface, on the other hand, is a much more challenging problem, mainly because of extremely low energy being carried by SFQ pulses. Ultrafast electro-optical (EO) modulators are not practical, since they are voltage-operated and thus incompatible with superconducting devices. In laser diode active modulation schemes, even after amplification, there is not enough energy in the SFQ output to drive the laser.

One technique for increasing the efficiency of an optical modulator is to use a Mach-Zehnder interferometer. Such an interferometer for use in an optical interconnect for a processor is taught in U.S. Pat. No. U.S. 6,243,180 B1 to Kanterakis et al. In a Mach-Zehnder interferometer, the light to be modulated is split into two optical paths; the light in one path is modulated, while the light in the other is not. The two paths are rejoined, and interference between the modulated and non-modulated light increases the contrast between the output light intensities corresponding to a logical "1" and "0." However, such a technique does not suffice to overcome the above-noted difficulties in providing an optical-to-electrical transducer for an SFQ.

In a separate field of endeavor, magneto-optic (MO) materials, whose optical properties change in accordance with an applied magnetic field, have been extensively studied. Europium-based magnetic and diluted magnetic semiconductors, such as europium oxides, EuO and europium monochalcogenides, EuS, EuTe, and EuSe, show an interesting range of behavior in the region of their ordering temperature $T_c$, as shown in Table I below. Both EuO and EuS order ferromagnetically, while EuTe and EuSe order antiferromagnetically, but they can be driven ferromagnetic with the application of an external H field. Below $T_c$, they also act as polarization rotors when placed in a magnetic field, a property known as the Faraday effect. The angle of Faraday rotation $\alpha$ is given by a simple relationship:

$$\alpha = VlE, \qquad (1)$$

where V, H. and l denote the Verdet constant, magnetic field intensity (magnitude of the magnetic field vector H), and the light path length in the MO material, respectively. Other things being equal, a high V value is desirable because it allows the use of low external H field modulation and a thinner, less absorbing medium.

Europium chalcogenides are characterized by some of the highest known values of V, but the MO effect itself has been demonstrated in a very large range of solid materials and liquids, including even glass. Recently, rare earth iron garnets, such as yttrium iron garnet (YIG) and its derivatives, have been demonstrated as effective MO materials. Their major advantages are excellent transmissivity of near-infrared radiation and $T_c$ well above room temperature. Thus, garnets have been proposed as active media for modulators for optical communication. The properties of selected MO materials, such as V, $T_c$, and optical operating wavelength are summarized in Table I:

| Compound | Verdet constant V ($^\circ$kOe$^{-1}$ $\mu$m$^{-1}$) | Critical temp. $T_c$ (K) | Wavelength $\lambda$ ($\mu$m) |
|---|---|---|---|
| EuS | 4.8 | 17 | 0.546 |
| EuSe | 9.6 | 7 | 0.546 |
| EuS/EuF$_2$ | 2.0 | 17 | 0.546 |
| YIG | 0.02 | 585 | >1.3 |
| (Tb)YIG | 0.03 | ~520 | >1.15 |
| (SmLuCa)YIG | 0.08 | >600 | >0.83 |
| Glass | 0.00007 | ~800 | 0.85 |

Another significant development in magnetism research has been the realization that it is possible to implement MO materials in optical systems to study transient phenomena on femtosecond times, or, equivalently, terahertz frequencies. An MO sampling system for picosecond characterization of magnetic systems is known, and it has been experimentally demonstrated that both EuS and EuSe are characterized by <2-ps MO response times, assuring above 150 GHz 3-dB analog bandwidth. In garnets, the response is limited by the ferromagnetic resonance frequency (e.g., 82.3 GHz for Bi-YIG) with a potential for reaching 1 THz.

An optical signal processing apparatus using the MO properties of a monocrystalline thin film of YIG is taught in European Published Patent Application No. EP 0 942 317 A1 to Tsutsumi. However, Tsutsumi reports an efficiency of only about one percent.

SUMMARY OF THE INVENTION

It will be apparent from the above that a need exists in the art for a transducer suitable for an SFQ-to-optical digital interface. It is therefore a primary object of the invention to provide a modulator which is compatible with superconducting devices.

It is another object of the invention to provide a modulator which is capable of operating with low-energy inputs.

It is still another object of the invention to provide a modulator which operates at a sufficient speed and efficiency for use with a superconducting computing device without the need for an amplifier.

To achieve the above and other objects, the present invention is directed to a magneto-optic (MO) modulator based on a MO active medium. The medium is disposed on a superconducting ground plane, and a microwave microstrip line (MSL) is overlaid on the MO active medium for use as a signal electrode. A signal input to the MSL causes an H field in the MO active medium, which causes the MO active medium to rotate the polarization of light passing therethrough.

The present invention permits the realization of an ultrafast magneto-optic (MO) modulator for the SFQ-to-optical digital interface. The MO modulator is based on the Faraday effect and uses a fiber-optic carrier wave (CW) light delivery. The light modulation occurs in parallel to the magnetic field and perpendicular to the rf signal propagation. The low characteristic impedance of the MSL, together with the superconducting ground plane, assures that the magnetic field component of the electromagnetic signal is uniform and effectively "focused" across the length of modulator.

For several different MO devices of the above geometry, magnetic field distributions have been numerically calculated inside the MO material, and it has been verified that the H field was uniform over the width of the MSL top electrode. The input modulation current was assumed to be 1 mA—the realistic upper current output value for the Nb-based SFQ circuit. Taking EuSe as the MO material at 4.2 K, H=2.51 Oe for a 100-$\mu$m-wide top electrode. The H magnitude can be further increased to as much as 60 Oe for a macroscopic 5-mm-long device, yielding a 36-degree phase retardation and ~10% modulation depth in a single-pass-type device.

The most desired configuration for the MO modulator is a Mach-Zehnder design. The Mach-Zehnder interferometer increases the device sensitivity, making it very attractive for use in a direct, SFQ-to-optical digital I/O interface.

The present invention permits the realization of an efficient SFQ-to-optical output interface for ultrafast digital superconducting electronics, based on a passive MO modulator operated as a Mach-Zehnder interferometer. In contrast to amplification schemes, plagued with the unsolvable problem of getting high enough signal-to-noise ratio, the passive modulation scheme implemented in the present invention requires only a sensitive medium and optimized coupling between electrical and optical signals. A modulator according to the present invention requires only an "imprint" of the SFQ-coded information onto the optical beam in order to carry it into room temperature, where the information can be amplified and analyzed using conventional optoelectronics.

The simulations performed showed that the optimal design should be based on an MSL with the light path perpendicular to the electromagnetic signal propagation. As the active medium, the best candidate is EuSe, which combines H-field sensitivity large enough to detect SFQ pulses with above 100 GHz modulation bandwidth. The low characteristic impedance of the MSL makes it easy to match the modulator with SFQ circuitry, while the Mach-Zehnder interferometer configuration significantly increases its modulation efficiency.

While garnets are currently considered to be the MO materials of choice for ultrafast room-temperature optical communication, europium chalcogenides are clearly ideal for low-temperature superconducting optoelectronic applications. They not only exhibit the highest values of the Verdet constant and single picosecond response times, but they can also be easily deposited in a thin-film form, using either vacuum evaporation or laser ablation. Therefore, a preferred embodiment of the present invention uses EuSe as the MO active material.

A preferred embodiment is directed to a superconducting MO modulator based on a microwave microstrip line (MSL) with a polarization-sensitive MO active medium and fiber-optic CW light delivery. Many different microwave transmission line configurations have been studied, including coplanar waveguides and slot lines, and it has been realized that the MSL configuration with the superconducting ground plane provides the best operating conditions. The MSL can obtain a very long interaction distance l and a low characteristic impedance of the line, which assures that the H-field component of the electromagnetic signal is uniform along the modulator length. The MO modulator operation is based on the Faraday effect; thus, light modulation direction occurs in parallel to the H field and perpendicular to the signal propagation. That aspect of the MO modulator, in contrast to the most common EO (electro-optic) modulators, eliminates the need to match the velocities of the electromagnetic signal and light, unless a multipass design is considered.

BRIEF DESCRIPTION OF THE DRAWINGS

A preferred embodiment of the present invention will be set forth with reference to the drawings, in which.

DETAILED DESCRIPTION OF THE PREFERRED EMBODIMENT

Figure 1A:
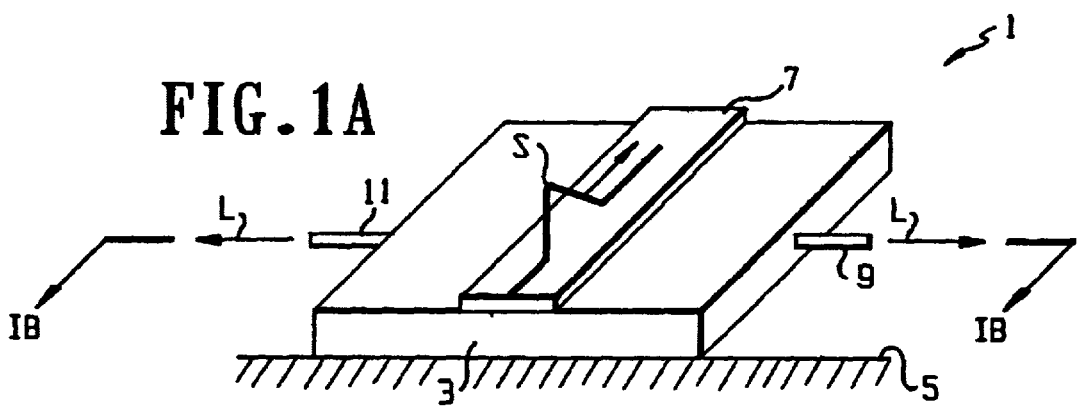
FIG. 1A is a diagram showing the magneto-optic modulator according to the preferred embodiment.

A preferred embodiment of the present invention will be set forth in detail with reference to the drawings, in which like reference numerals refer to like components throughout.

FIG. 1A shows a preferred embodiment of a MO modulator 1 according to the preferred embodiment. The MO modulator 1 is based on a MO material 3, preferably a monocrystalline thin film of EuSe, deposited on a superconducting ground plane 5. A microwave MSL 7 is formed on the thin film 3 of EuSe. Also provided on the thin film 3 are a fiber optic input 9 and a fiber optic output 11, or other suitable light-coupling elements.

In operation, a carrier wave of light L from a laser or other suitable source is input into the MO material 3 through the fiber optic input 9. The light L passes through the MO material 3 and exits through the fiber optic output 11. A signal S, carrying the information to be modulated into the light L, is input to the MSL 7. The signal S induces a magnetic field H, which changes the polarizing properties of the MO material 3, thereby modulating the light L.

Figure 1B:
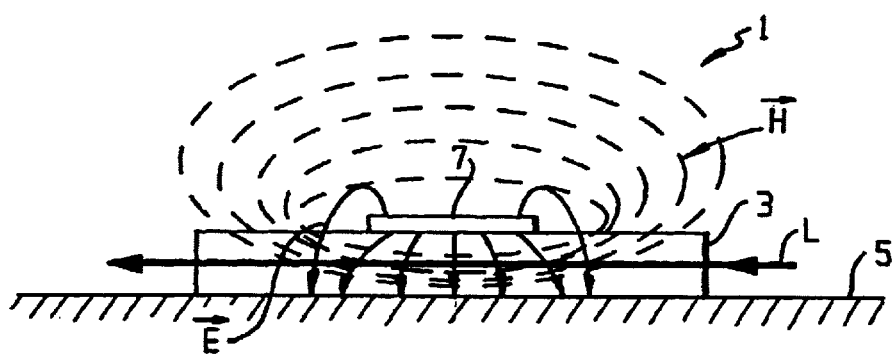
FIG. 1B is a cut-away view of the magneto-optic modulator of FIG. 1A, showing the electric and magnetic field lines.

FIG. 1B is a cross-sectional view of the MO modulator 1 taken along the lines IB—IB of FIG. 1A. FIG. 1B shows the lines of the electric field E and the magnetic field H induced by the signal in the MSL 7. In the vicinity of the path of the light L, the magnetic field H is sufficiently uniform for effective modulation.

Figure 2:
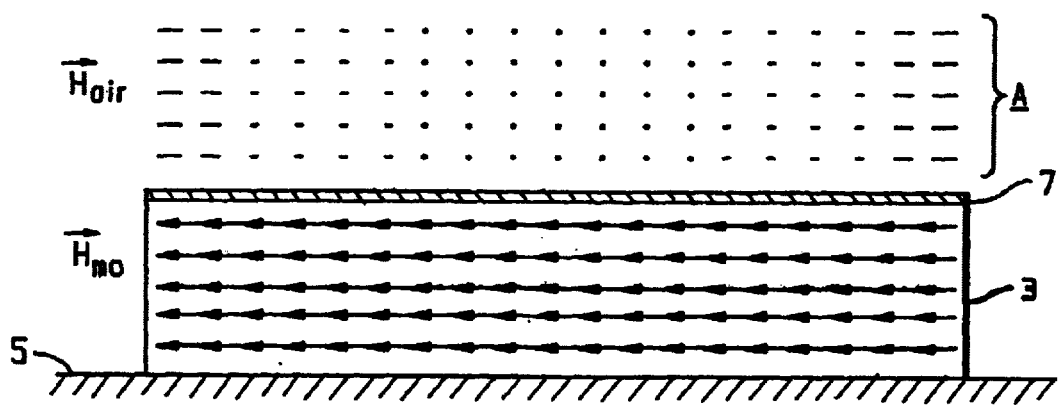
FIG. 2 is a diagram showing the directions and intensities of the magnetic field.

The uniformity of the H field inside the modulator was extensively simulated numerically in order to optimize the device design (primarily the length-to-height aspect ratio) and obtain the actual value of H along the optical path. FIG. 2 graphically shows the H-field distribution along the length of the MO crystal and shows both the magnetic field $H_{MO}$ in the MO material 3 and the magnetic field $H_{air}$ in the air A above the MSL 7. Simulations were carried out, using the quasi-static approximation method with the E and H fields treated as quasi-TEM. As the MO material, EuSe was selected, characterized at high frequencies by $\mu_r \approx 1$ and $\epsilon_r \approx 15$. The amplitude of the input current pulse was assumed to be 1 mA, which corresponds to the 10 kA/cm$^2$ critical current density for a nominal 10-$\mu$m$^2$ Josephson tunnel junction, the specification easily achievable within the current Nb-trilayer technology. For the 100-$\mu$m-wide and 5-$\mu$m-high MSL and the EuSe MO material, the H uniformity along the optical pass was found to be better than 98% with the maximum amplitude $H_{max}$ at the device center equal to 2.51 Oe, which, according to Eq. (1), corresponds to $\alpha=4.52°$. A much higher value of the H field was obtained for a macroscopic 0.5-mm-high device with l=5 mm. In that case, $H_{max}=61$ Oe, which leads to very respectable 37° angle of polarization rotation. Such a device, based on a MO single crystal, could be implemented in a superconducting circuit as a hybrid element.

Figure 3:
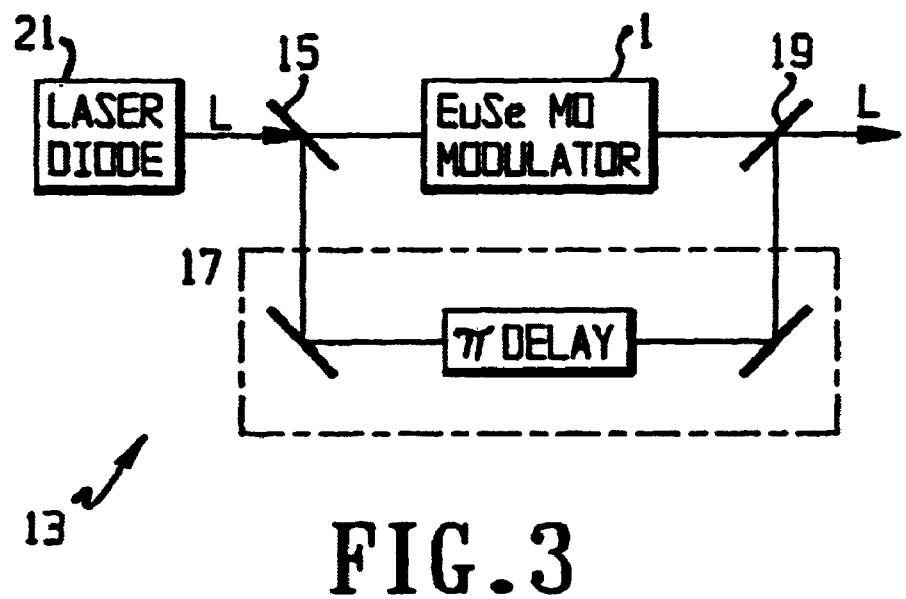
FIG. 3 is a block diagram showing a Mach-Zehnder interferometer incorporating the modulator of FIG. 1A.

As is schematically shown FIG. 3, the MO modulator 1 can be incorporated into a Mach-Zehnder configuration 13 to function as an intensity modulator. In the Mach-Zehnder configuration 13, the entering light L is split by a beam splitter 15 between the MO modulator 1 and a delay arm 17 which imposes a phase delay of $\pi$ on the light. The modulated light from the MO modulator 1 and the unmodulated light from the delay arm 17 are recombined by a beam recombiner 19.

The light source is a commercial green-light CW laser diode 21, operating at 0.546 $\mu$m—the optimal wavelength for EuSe. To obtain the highest contrast aspect between the SFQ logical "1" and "0" (the highest signal-to-noise ratio at the modulator optical output), the phase difference between the interferometer's arms must be equal to $\pi$, so with no signal applied to the MO material, light at the output will be completely extinguished. In that situation, the light signal is present at the output of the device only when the SFQ pulse is applied to the modulator 1. The transmittance T of the Mach-Zehnder modulator 13 in such a configuration is given by:

$$T=\cos^2[(\pi+\alpha)/2]. \qquad (2)$$

Even the 100-$\mu$m-long modulator design gives an easily detectable 0.2% modulation depth, while the hybrid device provides an output intensity of approximately 10% of the input light intensity, making the EuSe MO modulator very attractive for a direct, SFQ-to-optical digital interface.

Figure 4:
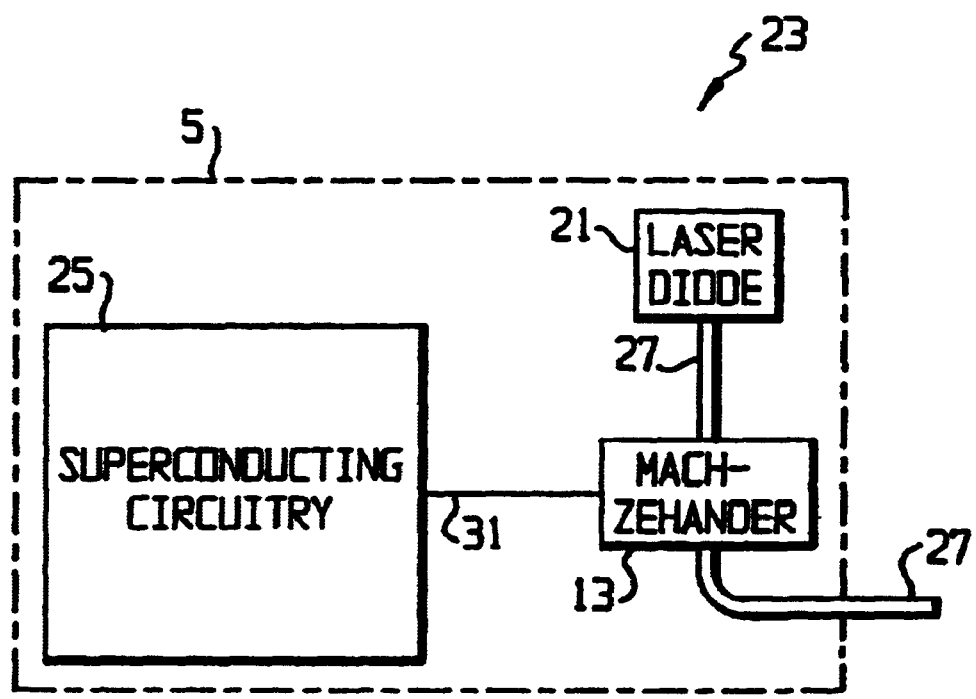
FIG. 4 is a block diagram showing a superconducting hybrid circuit incorporating the Mach-Zehnder interferometer of FIG. 3.

A superconducting circuit in which the MO modulator is implemented as a hybrid element is shown in FIG. 4. In the superconducting circuit 23 of FIG. 4, the superconducting ground plane 5 supports not only the modulator, but also the superconducting circuitry 25 to be interfaced to the outside world. An output signal from the superconducting circuitry 25 is carried through a signal line 31 into the Mach-Zehnder interferometer 13. Light from a laser diode 21 is carried by an optical fiber 27 into the interferometer 13. Output light is carried by an optical fiber 29 outside the circuit.

While a preferred embodiment of the present invention has been set forth above, those skilled in the art who have reviewed the present disclosure will readily appreciate that other embodiments can be realized within the scope of the present invention. For example, any suitable light coupling devices could be used to couple the light L into and out of the MO material, such as prisms or lenses. Also, instead of a Mach-Zehnder interferometer, another configuration, such as a polarizer and analyzer, can be used. Therefore, the present invention should be construed as limited only by the appended claims.

I claim:

1. A magneto-optic modulator for modulating light, the modulator comprising:

a superconducting ground plane;

a magneto-optic material on the superconducting ground plane;

a microwave microstrip line on a side of the magneto-optic material opposite the superconducting ground plane;

a first light coupler for coupling carrier wave light into the magneto-optic material; and a second light coupler for coupling the carrier wave light out of the magneto-optic material.

2. The magneto-optic modulator of claim 1, wherein the magneto-optic material comprises EuSe.

3. The magneto-optic material of claim 2, wherein the EuSe is a monocrystalline film.

4. The magneto-optic modulator of claim 1, further comprising:

a delay arm;

a beam splitter for diverting a portion of the carrier wave light away from the first light coupler and into the delay arm; and a beam recombiner for combining the carrier wave light from the second light coupler with the carrier wave light from the delay arm.

5. The magneto-optic modulator of claim 4, wherein the delay arm imposes a phase delay of $\pi$ on the carrier wave light passing through the delay arm.

6. A superconducting hybrid circuit comprising:

a superconducting ground plane;

superconducting circuitry on the superconducting ground plane, the superconducting circuitry having a signal output;

a magneto-optic material on the superconducting ground plane;

a microwave microstrip line on a side of the magneto-optic material opposite the superconducting ground plane;

a signal line for carrying a signal from the signal output to the microwave microstrip line;

a first light coupler for coupling carrier wave light into the magneto-optic material; and a second light coupler for coupling the carrier wave light out of the magneto-optic material.

7. The superconducting hybrid circuit of claim 6, wherein the second light coupler comprises an optical fiber for carrying the carrier wave light out of the superconducting hybrid circuit.

8. The superconducting hybrid circuit of claim 6, wherein the superconducting circuitry comprises a single-flux-quantum logic system.

* * * * *